(12) United States Patent
Webb et al.

(10) Patent No.: US 9,673,986 B2
(45) Date of Patent: *Jun. 6, 2017

(54) METHODS AND SYSTEMS FOR INCREASING THE SECURITY OF PRIVATE KEYS

(71) Applicant: Daon Holdings Limited, George Town (KY)

(72) Inventors: Andrew Supplee Webb, Dover, DE (US); Michael Peirce, Dublin (IE)

(73) Assignee: DAON HOLDINGS LIMITED, George Town (KY)

( * ) Notice: Subject to any disclaimer, the term of this patent is extended or adjusted under 35 U.S.C. 154(b) by 113 days.

This patent is subject to a terminal disclaimer.

(21) Appl. No.: 14/445,163

(22) Filed: Jul. 29, 2014

(65) Prior Publication Data

US 2014/0337629 A1    Nov. 13, 2014

Related U.S. Application Data

(63) Continuation of application No. 13/484,614, filed on May 31, 2012, now Pat. No. 8,832,443.

(51) Int. Cl.
| | |
|---|---|
| *H04L 29/06* | (2006.01) |
| *H04L 9/32* | (2006.01) |
| *H04L 9/08* | (2006.01) |
| *G06F 21/00* | (2013.01) |
| *G06F 15/16* | (2006.01) |

(52) U.S. Cl.
CPC ......... *H04L 9/3263* (2013.01); *H04L 9/088* (2013.01); *H04L 9/0825* (2013.01); *H04L 9/3236* (2013.01); *H04L 2463/062* (2013.01)

(58) Field of Classification Search
None
See application file for complete search history.

(56) References Cited

U.S. PATENT DOCUMENTS

| | | | | |
|---|---|---|---|---|
| 5,841,865 | A * | 11/1998 | Sudia | G06Q 20/02 380/277 |
| 6,760,752 | B1 * | 7/2004 | Liu | H04L 63/0428 709/206 |
| 2004/0010697 | A1 * | 1/2004 | White | G06F 21/31 713/186 |

(Continued)

OTHER PUBLICATIONS

International Search Report dated Jan. 29, 2013 for counterpart International Application No. PCT/US12/65767.

*Primary Examiner* — Eric Chen
(74) *Attorney, Agent, or Firm* — Kevin McDermott, Esq.

(57) ABSTRACT

A method for increasing the security of private keys is provided that includes generating transaction data at a device operated by a user and processing the transaction data. Moreover, the method includes determining whether the user permits using a private key that is associated with the user and with a public-private key pair of the user. The private key is stored in a computer system different from the device. Furthermore, the method includes authenticating the user when the user permits using the private key, applying the private key to other data after successfully authenticating the user, and transmitting the other data to the device. The method also includes conducting a transaction with the transaction data.

18 Claims, 5 Drawing Sheets

| PRIVATE KEY | LEVEL OF AUTHENTICATION | AUTHENTICATION DATA REQUIREMENT |
|---|---|---|
| Financial Transaction Key | High | Iris |
| Health Care Transaction Key | High | Iris |
| Document Transaction Key | Medium | Finger |
| E-mail Transaction Key | Low | Voice |

(56) References Cited

U.S. PATENT DOCUMENTS

| | | | |
|---|---|---|---|
| 2004/0042620 A1* | 3/2004 | Andrews | H04L 9/0894 380/286 |
| 2005/0114652 A1* | 5/2005 | Swedor | H04L 12/58 713/156 |
| 2006/0123476 A1* | 6/2006 | Yaghmour | H04L 12/58 726/22 |
| 2007/0143407 A1* | 6/2007 | Avritch | G06Q 10/107 709/206 |
| 2007/0255790 A1 | 11/2007 | Weksler et al. | |
| 2008/0307226 A1* | 12/2008 | Chow | H04L 12/585 713/175 |
| 2010/0100465 A1 | 4/2010 | Cooke et al. | |
| 2012/0170753 A1* | 7/2012 | Pandrangi | G06F 21/6209 380/286 |
| 2012/0204032 A1* | 8/2012 | Wilkins | H04L 9/006 713/170 |
| 2013/0086637 A1* | 4/2013 | Cotterill | G06F 21/35 726/4 |

* cited by examiner

28↙

| PRIVATE KEY | LEVEL OF AUTHENTICATION | AUTHENTICATION DATA REQUIREMENT |
|---|---|---|
| Financial Transaction Key | High | Iris |
| Health Care Transaction Key | High | Iris |
| Document Transaction Key | Medium | Finger |
| E-mail Transaction Key | Low | Voice |

METHODS AND SYSTEMS FOR INCREASING THE SECURITY OF PRIVATE KEYS

CROSS-REFERENCE TO RELATED APPLICATIONS

This is a continuation application of U.S. patent application Ser. No. 13/484,614, filed May 31, 2012, the disclosure of which is incorporated herein by reference.

BACKGROUND OF THE INVENTION

This invention relates generally to cryptographic public-private key pair security techniques, and more particularly, to methods and systems for increasing the security of private keys used in such techniques.

Computer applications have been known to use public-private key pairs to secure e-mail messages, sign and verify documents, and encrypt and decrypt data. Each public-private key pair is associated with a particular user. The private key is typically secret and is available only to the particular user while the corresponding public key is typically not secret and is available to any member, or entity, of the public that desires to communicate with the user. Software-based processes are generally used to confidentially store each private key in a file in a personal device trusted by the user, for example, a personal computer of the user. Non-software-based processes may also be used for confidentially storing private keys, for example, by storing the private keys in hardware security modules, or smart cards. Public keys are typically stored in many devices.

Public-private key pairs are generally used to ensure that only the user associated with a private key corresponding to a public key, where the public key was used to encrypt a message or document, can decrypt the message or document, and to ensure secure network-based communications between known senders and recipients. Consequently, messages and documents secured with cryptographic key techniques are generally believed to be private and secure.

Unfortunately, imposters have also been known to surreptitiously obtain private keys by phishing over networks and by otherwise conducting malware attacks against computer systems. For example, imposters have been known to surreptitiously arrange for malware that can obtain private keys, to reside on personal devices of users. Imposters fraudulently use the obtained private keys and thus render ineffective the protection provided by cryptographic public-private key security techniques. Attempts have been made to counter such attacks by using password-protection schemes. In such schemes, after the password is confirmed the private key is available for use. However, imposters have also been known to overcome such password protection schemes by conducting equally sophisticated attacks to surreptitiously obtain the passwords.

BRIEF DESCRIPTION OF THE INVENTION

In one aspect, a method for increasing the security of private keys is provided that includes generating transaction data at a device operated by a user and processing the transaction data. Moreover, the method includes determining whether the user permits using a private key that is associated with the user and with a public-private key pair of the user. The private key is stored in a computer system different from the device. Furthermore, the method includes authenticating the user when the user permits using the private key, applying the private key to other data after successfully authenticating the user, and transmitting the other data to the device. The method also includes conducting a transaction with the transaction data.

In another aspect, a system for increasing the security of private keys is provided. The system includes at least one client device configured to generate public-private key pairs and to generate and process transaction data. Moreover, the system includes at least one communications device configured to at least capture authentication data, and a private key computer system configured to store private keys, decrypt messages, decrypt documents and communicate with the at least one client device. Furthermore, the system includes an authentication system including an authentication database that is configured to authenticate users, store enrollment data records of users, and communicate with the at least one communications device, the at least one client device, and the private key computer system. The system also includes an e-mail server configured to communicate with the at least one client device and the at least one communications device.

The private key computer system is configured to determine whether a user operating the at least one client device permits using a private key of the user, and the authentication system is configured to authenticate the user when the user permits using the private key. The private key computer system is also configured to apply the private key to the other data after successfully authenticating the user, and the at least one client device is further configured to receive the other data after the private key is applied.

In yet another aspect, a computer program recorded on a non-transitory computer-readable recording medium, included in a private key security computer system for enabling increased security of private keys, is disclosed. The computer program includes instructions, which when read and executed by the private key security computer system, cause the private key security computer system to generate transaction data in response to a user, and determine whether the user permits using a private key of the user. The private key is also the private key included in a public-private key pair of the user. The computer program also causes the private key security computer system to authenticate the user when the user permits using the private key, apply the private key to the data derived from the transaction data after successfully authenticating the user, and conduct a transaction with the transaction data.

DETAILED DESCRIPTION OF THE INVENTION

Figure 1:
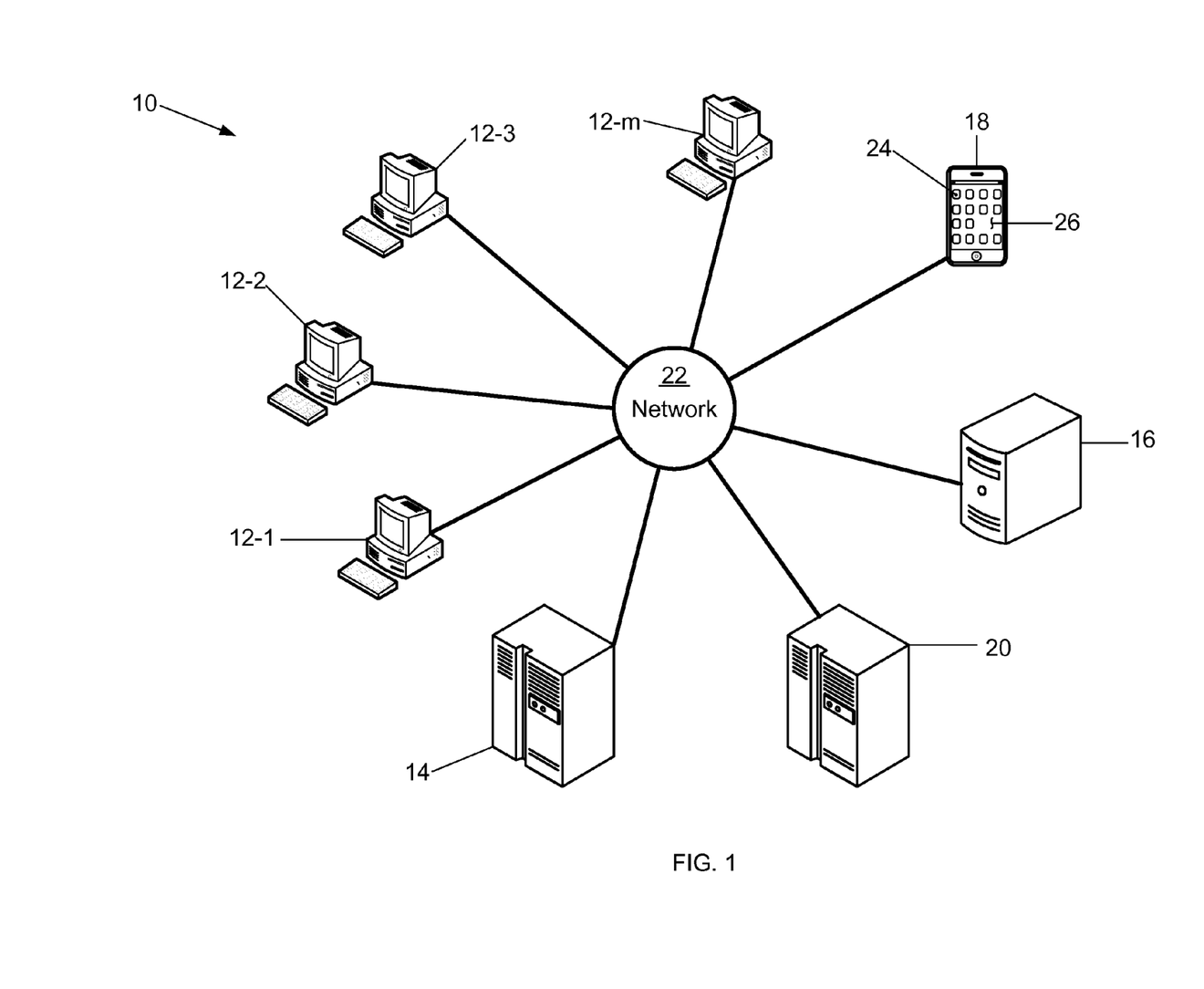
FIG. 1 is a block diagram of an exemplary embodiment of a private key security computer system for increasing the security of private keys against attack by imposters.

FIG. 1 is a block diagram of an exemplary embodiment of a system architecture of a Private Key Security Computer (PKSC) System 10 for increasing the security of private keys against attack by imposters. More specifically, the PKSC system 10 includes components such as, but not limited to, Client Devices 12-*m*, a Private Key (PK) System 14, an Authentication Computer (AC) System 16, a Mobile Communications (MC) Device 18, and an E-Mail Server 20.

Each client device 12-*m* is a personal computer that includes devices such as, but not limited to, a CD-ROM drive for reading data from computer-readable recording mediums, such as a compact disc-read only memory (CD-ROM), and a digital versatile disc (DVD). Moreover, each client device 12-*m* includes a display device such as, but not limited to, a liquid crystal display (LCD), a cathode ray tube (CRT) and other display monitors. Furthermore, each client device 12-*m* may include a printer and input devices such as, but not limited to, a mouse (not shown), keypad (not shown), a keyboard, a camera (not shown), a microphone (not shown), and any type of biometric capture device (not shown). Each client device 12-*m* stores applications as well as certificates of users. The client devices 12-*m* may be used to capture authentication data.

Moreover, each client device 12-*m* is configured to communicate with the PK system 14, the AC system 16, the MC device 18, the E-mail Server 20, and other systems (not shown) and devices (not shown) over a communications network 22. The communications network 22 is a 4G communications network. Alternatively, the communications network 22 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet. The network 22 may also be any type of wired network.

Although each client device 12-*m* is a personal computer in the exemplary PKSC system 10, the client devices 12-*m* may alternatively be any computing device capable of executing operating systems that generate public-private key pairs. Such devices include, but are not limited to, tablet computers, smart phones, laptop computers, and any type of communications device having wireless capabilities such as a personal digital assistant (PDA). Although the client devices 12-*m* are capable of executing operating systems that generate private keys, private keys are not stored therein. Instead private keys generated by the client devices 12-*m* are stored in the PK system 14. The designation "m" as used in conjunction with the client device designation 12-*m* is intended to indicate that any number "m" of client devices may be included in the PKSC system 10.

The PK system 14 is a secure computer system that includes components such as, but not limited to, a database server, an application server, a directory server, a web server, and a disk storage unit that may be used to store any kind of data. The disk storage unit may store at least one database such as, but not limited to, a database that securely stores private keys of users. A plurality of private keys may be stored in the PK system 14 for each user that are each categorized according to a type of transaction. For example, each user may have a private key to be used for all financial transactions, a different private key to be used for all health care transactions, a different private key to be used for accessing documents such as, but not limited to, electronic birth certificates, and yet another private key to be used for accessing e-mail accounts and conducting e-mail transactions. Thus, it should be appreciated that each user may have any number of private keys that are each used for different types of transactions. Each of these private keys may be of a different length or use different cryptographic algorithms that result in different security levels between private keys. By storing private keys in the PK system 14 instead of on personal devices trusted by users, security of private keys is facilitated to be increased because the private keys cannot be obtained from trusted personal devices compromised by imposters.

Applications stored in the PK system 14 may cause the PK system 14 to perform functions such as, but not limited to, identifying a private key corresponding to a type of transaction as the private key to be applied to data, signing hashes with private keys, decrypting encrypted e-mail messages, and decrypting documents. Such applications generally require substantial computing capacity. By executing such applications on the PK system 14 instead of on a personal device trusted by a user, such as a client device 12-*m*, the personal device of the user does not perform these functions and may instead perform other functions. As a result, executing such applications on the PK system 14 facilitates efficient use of computer resources in the PKSC system 10. The PK system 14 is also configured to at least communicate with the client devices 12-*m* and the AC system 16 over the network 22, and to control application of the private keys stored therein to data.

The AC system 16 includes components such as, but not limited to, a web server, a database server, an application server, an authentication server, a directory server and a disk storage unit that may be used to store any kind of data. The disk storage unit may store at least one database such as, but not limited to, an authentication database. The authentication server performs matching of any feature or information associated with users to authenticate the identity of users as described herein.

The AC system 16 is configured to communicate with the PK system 14, the MC device 18, other devices (not shown), and other systems (not shown) over the network 22. Moreover, the AC system 16 performs functions such as, but not limited to, authenticating users, storing authentication policies for determining authentication data to be used during authentication transactions, and storing at least authentication data of each of a plurality of authorized users in a respective enrollment data record. The enrollment data record of each authorized user stored in the AC system 16 includes at least enrollment authentication data. Enrollment authentication data is authentication data obtained from users during enrollment in the AC system 16. Phrases may be recited by users during enrollment and included in the enrollment data records as voice biometric data. Biographic data may also be included in the enrollment data records.

The MC device 18 is a smart phone that stores applications and data therein. The MC device 18 may include at least one of buttons and icons 24 for at least entering commands and invoking applications stored therein, and a display screen 26 such as, but not limited to, a Liquid Crystal Display (LCD), that displays at least one of text and images. Moreover, the MC device 18 may include cameras (not shown) and a microphone (not shown).

Although the MC device 18 is a smart phone in the exemplary PKSC system 10, the MC device 18 may alternatively be any device capable of at least storing data, displaying at least one of text and images, and capturing and transmitting data. Such other devices include, but are not limited to, a cellular phone, a tablet computer, a laptop computer, a personal computer, and any type of communications device having wireless capabilities such as a personal digital assistant (PDA). The MC device 18 may or may not be portable.

The MC device 18 is configured to communicate with the client devices 12-m, the E-Mail server 20, the AC system 16, other systems (not shown), and devices (not shown) over the communications network 22. Moreover, the MC device 18 is configured to conduct communications such as cellular telephone calls and to access the Internet over the network 22.

The MC device 18 may be used to capture authentication data during authentication transactions. When the authentication data is biometric data, the MC device 18 may process captured biometric data prior to transmitting it to the AC system 16. For example, the MC device 18 may capture biometric data, compress it, and then transmit the compressed data to the AC system 16. Alternatively, the MC device 18 may create a biometric template from the captured biometric data, and then transmit the biometric template to the AC system 16. Although the PKSC system 10 includes one MC device 18, the PKSC system 10 may alternatively include any number of MC devices 18 that are each associated with a same or different user.

The e-mail server 20 is a computer that manages e-mail messages. More specifically, the e-mail server 20 receives e-mail messages from devices such as, but not limited to, the client devices 12-m, and transmits e-mail messages to other devices. E-mail message contents as described herein include, but are not limited to, drafted messages and attachments. Moreover, the e-mail server 20 is configured to communicate with at least the client devices 12-m and MC devices 18 over the network 22.

Although the PKSC system 10 does not include a Certificate Authority, the PKSC system 10 may alternatively include a Certificate Authority that communicates with any of the components of the PKSC system 10 over the network 22. A Certificate Authority is a trusted entity, unrelated to parties that may be involved in a transaction, that stores public keys of a plurality of users, typically in a database. Each of the public keys corresponds to a private key of a respective user stored in the PK system 14. Certificate Authorities also generate and issue certificates that each include the public key of a respective user. By virtue of generating the certificate at a trusted Certificate Authority, the public key contained in an issued certificate is deemed authentic. The issued certificates are typically provided to entities for checking digital signatures generated with the private key of a user.

The client devices 12-m, the PK system 14, the AC system 16, the MC device 18, and the e-mail server 20, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the client devices 12-m, the PK system 14, the AC system 16, the MC device 18, and the e-mail server 20. The above examples are exemplary only, and are thus not intended to limit in any way the definition and/or meaning of the term "processor."

The respective memories (not shown) in the client devices 12-m, the PK system 14, the AC system 16, the MC device 18, and the e-mail server 20 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in each client device 12-m, the PK system 14, the AC system 16, the MC device 18, and the e-mail server 20. Moreover, each of the respective memories (not shown) can be a computer-readable recording medium used to store computer programs or executable instructions that are executed, respectively, by the client devices 12-m, the PK system 14, the AC system 16, the MC device 18, and the e-mail server 20. Moreover, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

Authentication data is any data that may be used to authenticate the identity of users. For example, authentication data may be biometric data that corresponds to any biometric characteristic desired to be used for verifying the identity of a user during an authentication transaction. Such biometric characteristics include, but are not limited to, face, finger, iris, voice and palm, and any combination of face, finger, iris, voice and palm. The biometric data may take any form such as, but not limited to, photographic images and voice recordings. Voice biometric data may be recitations of information not publicly known such as, but not limited to, information personal to respective users. Alternatively, authentication data may be non-biometric data such as, but not limited to, Global Positioning System (GPS) coordinates and Personal Identification Numbers (PIN). Authentication data may also be any combination of biometric data from a same or different biometric characteristic, and any combination of biometric and non-biometric data.

An authentication data requirement is a requirement for authentication data that is to be used for conducting an authentication transaction. The authentication data requirement may be determined in any manner. For example, configurable authentication policies stored in the AC system 16 may be used for determining the authentication data requirement. Such policies may determine the authentication data requirement in any manner, for example, based on factors such as, but not limited to, the time of day, time since the last successful authentication, and the location of the user. Moreover, such policies may determine the authentication data requirement based on a level of authentication corresponding to the private key to be used for a particular type of transaction. Such authentication policies may also be stored in the PK system 14.

Figure 2:
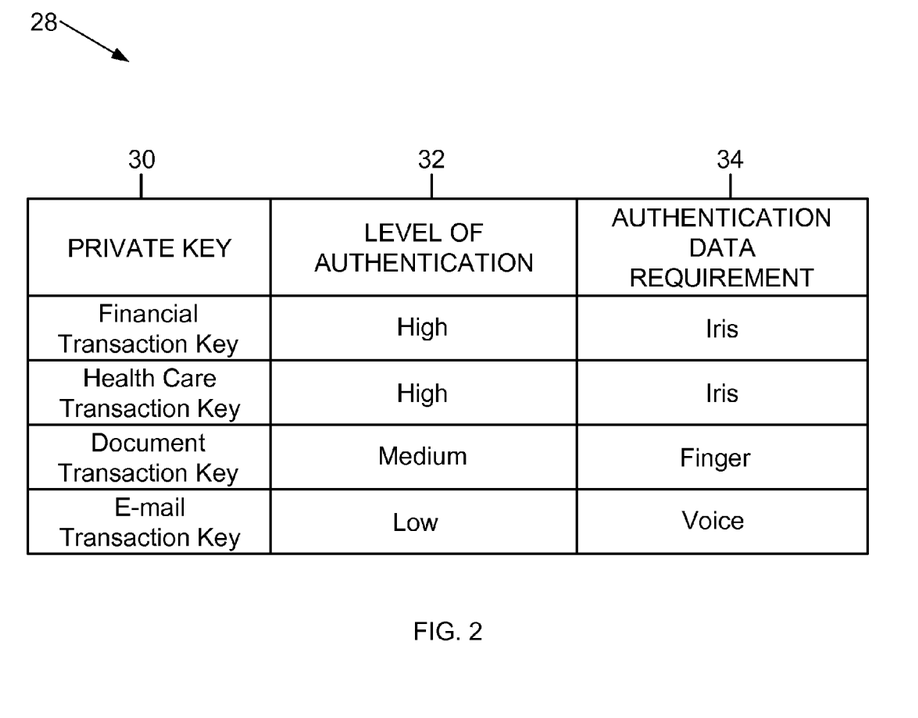
FIG. 2 is a diagram illustrating an exemplary policy for associating private keys with authentication data requirements.

FIG. 2 is a diagram illustrating an exemplary configurable policy 28 stored in the PK system 14 that is for associating private keys with authentication data requirements. The policy 28 includes private keys 30, levels of authentication 32, and authentication data requirements 34. The private keys 30 are each different and are each associated with a level of authentication 32, and each level of authentication 32 is associated with an authentication data requirement 34. By virtue of associating each level of authentication 32 with an authentication data requirement 34, each private key 30 is associated with an authentication data requirement 34. Each different private key 30 is to be used for a different type of transaction. More specifically, the policy 28 includes different private keys 30 that are to be used for financial, health care, document access, and e-mail transactions, respectively.

The levels of authentication 32 include, but are not limited to, low, medium, and high. Each level of authentication 32 corresponds to a different authentication data requirement 34. Specifically, the low, medium, and high levels of authentication 32 correspond to voice, finger and iris authentication data requirements 34. As the level of authentication 32 increases, the authentication data requirement 34 becomes more demanding. For example, the iris authentication data requirement 34 for a high level of authentication 32 is more demanding than the voice authentication data requirement 34 for a low level of authentication 32.

The policy 28 may be reconfigured by defining the private keys 30 and the levels of authentication 32 in any desirable manner that facilitates authenticating users. Furthermore, the policy 28 may be reconfigured by changing the private keys 30, the levels of authentication 32, and the authentication data requirements 34. Although four private keys 30 are included in the policy 28, any number of private keys 30 may alternatively be included.

The authentication policy 28 may be reconfigured by defining the authentication data requirements 34 and the levels of authentication 32 in any desirable manner that facilitates authenticating the identity of a user. Moreover, the policy 28 may be reconfigured by changing the definitions of the authentication data requirements 34 and the levels of authentication 32. An operator of the AC system 16, a service provider, or a combination of both may reconfigure the policy 28.

The levels of authentication 32 may be defined by a service provider to adequately protect access to data and services of the service provider. For example, a service provider may define the levels of authentication 32 to be negligible, low, medium, high, and very high. Service providers may also communicate with the AC system 16 to define authentication data requirements 34 deemed adequate to protect access to data and services of the service provider. For example, the AC system 16 may define the authentication data requirement 34 corresponding to the high level of authentication as defined by the service provider to be iris, voice and finger instead of only iris. Moreover, respective service providers may define both the levels of authentication 32 and the authentication data requirements 34 to adequately protect access to data and services of the service providers. A service provider is any commercial or governmental entity that stores data and provides services such as, but not limited to, security companies, banks and hospitals.

Users conduct electronic transactions that generally include information or data users prefer to be protected against attack by imposters. Such transactions include, but are not limited to, generating and transmitting e-mail messages, viewing e-mail message contents, conducting network-based payment transactions, obtaining network-based access to confidential data such as, but not limited to, medical records, and digitally signing documents. Some transactions may be network-based while others are not. Users generally conduct such electronic transactions with operating systems that use cryptographic public-private key pair security techniques to protect the information or data against attack by imposters. However, imposters have been known to conduct attacks that obtain the keys themselves, thus rendering ineffective the security provided by such cryptographic public-private key pair security techniques.

Figure 3:
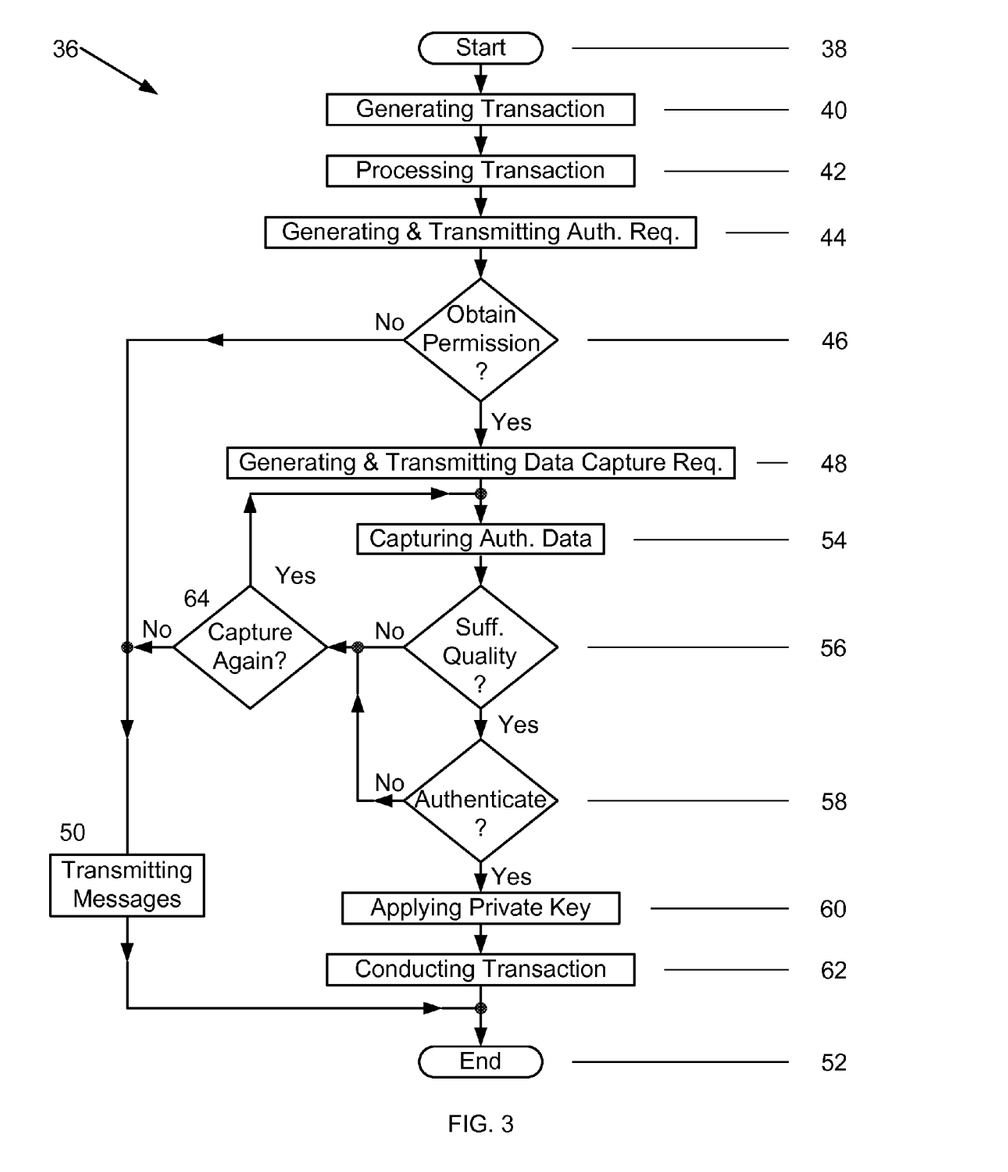
FIG. 3 is a flowchart illustrating an exemplary process for increasing the security of private keys against attack by imposters.

FIG. 3 is a flowchart 36 illustrating an exemplary process used by the PKSC system 10 for increasing the security of private keys, as well as data protected by cryptographic key pair techniques using such private keys, against attack by imposters to thus facilitate rendering effective the security provided by cryptographic key pair techniques. For the PKSC system 10, the process starts 38 when a user causes a client device 12-$m$ to generate transaction data 40 the user would like to protect against attack by imposters while conducting a transaction. In this exemplary process, the user operates client device 12-1, the transaction data is an e-mail message, and the transaction includes transmitting the e-mail message.

After generating the transaction data 40, the client device 12-1 continues by processing the transaction data 42. More specifically, the client device 12-1 continues by associating the certificate of the user with the transaction data, determining the location of the private key corresponding to the public key included in the certificate, generating an identifier for the transaction data, and preparing other data to which the private key is to be applied. The location of the private key is determined by identifying a component of the PKSC system 10 that stores private keys of the user. The client device 12-1 continues by determining that the private key is stored in the PK system 14, determining the type of transaction of the transaction data, and transmitting the transaction identifier, prepared other data, and type of transaction to the PK system 14. The transaction identifier is an alphanumeric or numeric character string of any length, and the prepared other data is a hash of the transaction data. However, in alternative processes the prepared other data may be the transaction data itself or any data that may be derived from the transaction data.

After receiving the transaction identifier, prepared other data, and type of transaction, the PK system 14 continues processing by identifying the private key of the user corresponding to the public key included in the certificate, and generating and transmitting 44 an authentication request message to the AC system 16. The authentication request message includes the transaction identifier, and a request that the AC system 16 obtain permission from the user to apply the identified private key to the prepared other data. Moreover, the authentication request message includes a request that the AC system 16 conduct an authentication transaction with the user after receiving permission. Next, the AC system 16 continues by determining whether the user permits 46 using the identified private key. More specifically, the AC system 16 continues by transmitting, to the MC device 18 of the user, the transaction identifier and a request for permission to use the identified private key 46. A message is displayed on the screen 26 for the user to see requesting permission. When permission is not obtained 46 from the user, the AC system 16 continues processing by transmitting a message 50 notifying the PK system 14 and the client device 12-1 that an error has occurred and processing ends 52.

However, when permission is obtained 46 from the user, the AC system 16 continues processing by authenticating the user. More specifically, the AC system 16 continues by determining an authentication data requirement 34, generating a data capture request message 48 that includes at least the authentication data requirement 34, and transmitting the data capture request message 48 to the client device 12-1. In this exemplary process, because the transaction data is an e-mail message the authentication data requirement 34 is voice biometric data.

After reading the authentication data requirement from the device 12-1, the user continues by capturing authentication data 54 from his self with the MC device 18 in accordance with the authentication data requirement 34. Next, processing continues by transmitting the captured authentication data to the AC system 16. The AC system 16 continues by determining whether the captured authentication data is of sufficient quality 56 for conducting an authentication transaction. If so, the AC system 16 continues by authenticating the user 58 by comparing the captured authentication data against enrollment authentication data of the user. When the captured authentication data matches the enrollment authentication data the user is successfully authenticated 58, and the AC system 16 transmits a successful authentication message to the PK system 14. In response, the PK system 14 continues processing by applying the identified private key to the prepared other data 60 and transmitting the prepared other data, with the identified private key thus applied, to the client device 12-1. The client device 12-1 continues by conducting the transaction 62. More specifically, the client device 12-1 continues by transmitting the transaction data to other client devices 12-m and MC devices 18 as designated by the user, for their respective users to see. Next, processing ends 52.

However, when the captured authentication data does not result in a successful authentication 58 due to insufficient quality 56 or inaccurate match 58, the AC system 16 determines whether authentication data should be captured again 64. If authentication data has been captured 54 three times or less, processing continues by transmitting a message to the client device 12-1 prompting the user to again 64 capture authentication data 54 in accordance with the authentication data requirement. After reading the message from the device 12-1, the user continues by capturing authentication data 54 in accordance with the authentication data requirement. However, if authentication data has been captured 54 greater than three times, authentication data is not captured again 64. Instead, the AC system 16 continues processing by transmitting a message 50 notifying the PK system 14 and client device 12-1 that an error has occurred, and processing ends 52. Although authentication data is captured 54 three times in the exemplary process before determining that authentication data should not be captured again 64, authentication data may alternatively be captured 54 any number of times before determining that authentication data should not be captured again 64.

Figure 4:
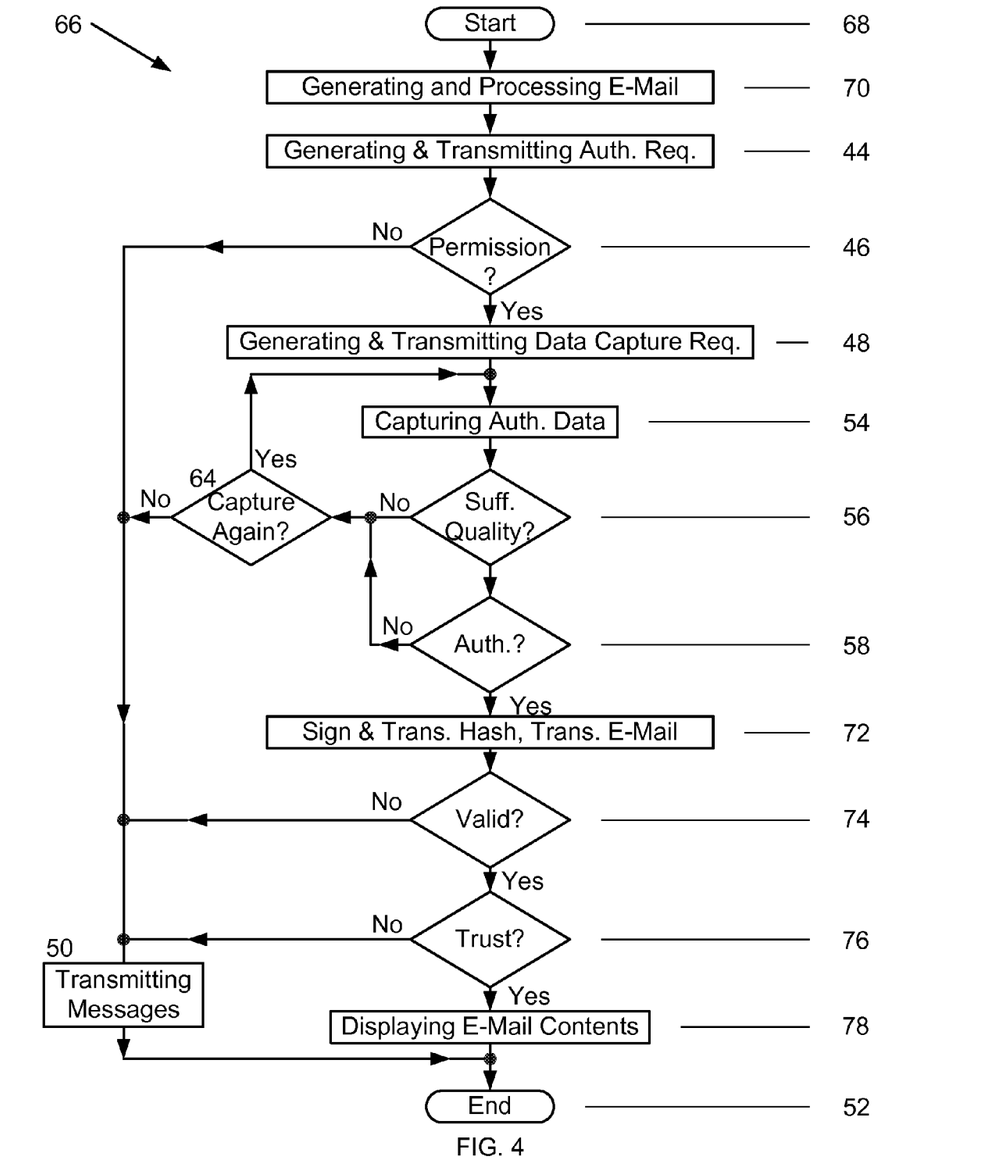
FIG. 4 is a flowchart illustrating an alternative exemplary process for increasing the security of private keys against attack by imposters.

The information shown in FIG. 4 is the same information shown in FIG. 3 as described in more detail below. As such, operations illustrated in FIG. 4 that are identical to operations illustrated in FIG. 3 are identified using the same reference numerals used in FIG. 3.

FIG. 4 is a flowchart 66 illustrating an alternative exemplary process used by the PKSC system 10 for increasing the security of private keys, as well as data protected by cryptographic key security techniques using such private keys, against attack by imposters to thus facilitate rendering effective the security provided by cryptographic key pair techniques. This alternative process is similar to that shown in FIG. 3. However, the generated transaction data is an e-mail message that is digitally signed and is processed differently. Moreover, the e-mail message is not displayed for a recipient to see until the e-mail message is deemed trustworthy.

For the PKSC system 10, this alternative exemplary process starts 68 with a user, operating the client device 12-1, generating an e-mail message 70 and specifying at least one recipient of the e-mail message. The user operating the client device 12-1 is the sender and the user operating the client device 12-2 is the at least one e-mail message recipient. Next, the client device 12-1 continues by processing 70 the e-mail message. More specifically, the client device 12-1 continues by associating a certificate of the sender with the e-mail message, determining the location of the private key corresponding to the public key included in the certificate, generating a transaction identifier for the e-mail message, and calculating a hash of the e-mail message to which the private key is to be applied. In this alternative process, the hash is the prepared other data to which the private key is to be applied. Next, the client device 12-1 continues processing by determining that the private key is stored in the PK system 14, determining the type of transaction to be an e-mail message, and by transmitting the type of transaction, the transaction identifier, and the calculated hash to the PK system 14.

After receiving the type of transaction, the transaction identifier, and the calculated hash, the PK system 14 continues by identifying the private key of the user corresponding to the public key included in the certificate. Next, processing continues by obtaining permission from the sender to use the identified private key, and by authenticating the identity of the sender. More specifically, processing continues by conducting operations 44, 46, 48, 50, 52, 54, 56, 58, and 64 as described herein with regard to the exemplary process illustrated in FIG. 3.

After successfully authenticating the sender 58, the AC system 16 continues by generating and transmitting a successful authentication message to the PK system 14. In response, the PK system 14 continues processing by applying the identified private key of the sender to the hash 72 and transmitting the hash 72, with the identified private key thus applied, to the client device 12-1. It should be understood that by virtue of applying the private key to the hash, the PK system 14 digitally signs the hash. Next, the client device 12-1 continues by generating a digitally signed e-mail message by associating the digitally signed hash with the e-mail message, and transmitting the digitally signed e-mail message 72 to the recipient at the client device 12-2 via the e-mail server 20.

After receiving the digitally signed e-mail message at the client device 12-2, the recipient indicates a desire to access or view the received e-mail message. Next, the client device 12-2 continues processing by determining whether the certificate associated with the received e-mail message is valid 74. The certificate is valid 74 when it is determined that the certificate was issued by a trusted Certificate Authority. When the certificate is determined to be invalid 74, processing continues by transmitting a message 50 informing the sender that an error has occurred and processing ends 52.

However, when the certificate is determined to be valid 74, the client device 12-2 continues by determining whether the received e-mail message is trustworthy 76. More specifically, the client device 12-2 continues by extracting the public key from the certificate associated with the e-mail message, and decrypting the digitally signed hash with the extracted public key to thus determine the hash calculated for the e-mail message prior to transmission. Next, the client device 12-2 continues by calculating a hash of the received e-mail message and comparing it against the hash calculated for the e-mail message prior to transmission. When the hash calculated for the received e-mail message matches the hash calculated for the e-mail message prior to transmission, the received and transmitted e-mail messages are considered the same. Thus, the received e-mail message is deemed secure and trustworthy 76. Next, the client device 12-2 continues by displaying a message 78 for the recipient to see indicating that the received e-mail message is trustworthy, and displaying the contents 78 of the e-mail message for the recipient to see. A secure e-mail message is a received e-mail message that was not modified after transmission. Trustworthy means that the source of an e-mail message is trusted.

However, when the hash calculated for the received e-mail message does not match the hash calculated for the e-mail message prior to transmission, the received e-mail message is deemed insecure and untrustworthy 76. Next, processing continues by transmitting a message 50 informing the sender that an error has occurred and processing ends 52.

Figure 5:
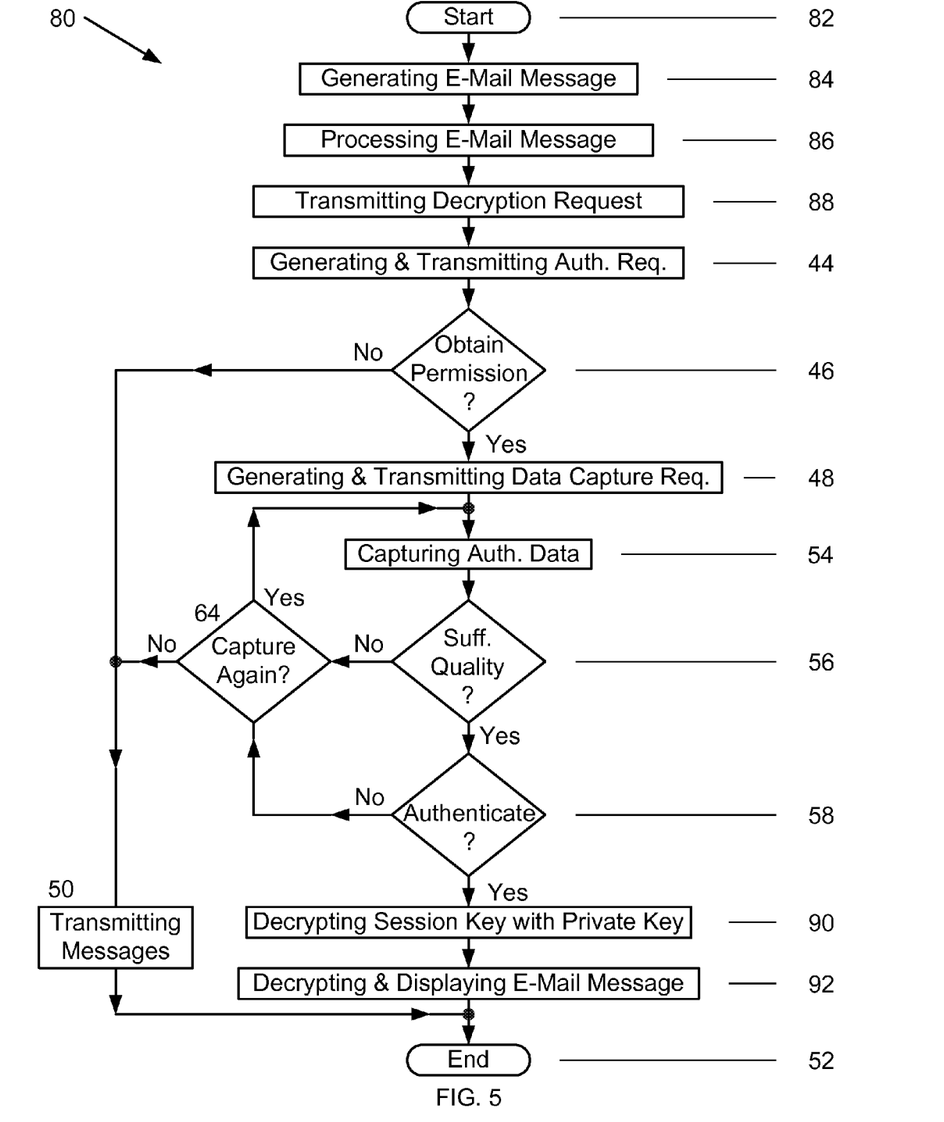
FIG. 5 is a flowchart illustrating yet another alternative exemplary process for increasing the security of private keys against attack by imposters.

The information shown in FIG. 5 is the same information shown in FIG. 3 as described in more detail below. As such, operations illustrated in FIG. 5 that are identical to operations illustrated in FIG. 3 are identified using the same reference numerals used in FIG. 3.

FIG. 5 is a flowchart 80 illustrating yet another alternative exemplary process used by the PKSC system 10 for increasing the security of private keys, as well as data protected by cryptographic key pair techniques using such private keys, against attack by imposters to thus facilitate rendering effective the security provided by cryptographic key pair techniques. This alternative process is similar to that shown in FIG. 3. However, the generated transaction data is an encrypted e-mail message that is processed differently than described herein with regard to FIG. 3. Moreover, because the e-mail message is encrypted, it is decrypted with a private key prior to displaying the e-mail message for the recipient to see.

For the PKSC system 10 this alternative process starts 82 with a user, operating the client device 12-1, generating an e-mail message 84 and specifying at least one recipient of the e-mail message. The user operating the client device 12-1 is the sender and the users operating the client devices 12-2 and 12-3 are the specified recipients. Next, the client device 12-1 continues by processing the e-mail message 86. More specifically, for each specified recipient, the client device 12-1 continues by generating a session key for the e-mail message, encrypting the session key with the public key of the specified recipient, and encrypting the e-mail message with the encrypted session key. In this alternative process, the encrypted session key is the prepared other data to which the private key is to be applied. Although the same process is used to encrypt the e-mail message for each specified recipient, because each specified recipient has a different session key, the e-mail message is encrypted differently for each specified recipient. Because the same procedure is followed by each client device 12-m for decrypting received e-mail messages, this alternative exemplary process is described with regard to one of the specified recipients, the specified recipient operating client device 12-2.

Next, the client device 12-1 continues by transmitting the encrypted e-mail message to the specified recipient operating device 12-2. After the encrypted e-mail message is received at the client device 12-2, the recipient indicates a desire to access or view the received e-mail message. In response, the client device 12-2 continues processing by determining that the private key of the specified recipient operating the device 12-2 is stored in the PK system 14, and determining the type of transaction to be an encrypted e-mail message. Next, the client device 12-2 continues by generating and transmitting a decryption request message 88 to the PK system 14. The decryption message includes a transaction identifier for the received e-mail message, the type of transaction, and the encrypted session key, and requests the PK system 14 to decrypt the encrypted session key included in the received e-mail.

After receiving the decryption request message, the PK system 14 continues by identifying the private key of the specified recipient corresponding to the public key included in the certificate. Next, processing continues by obtaining permission from the specified recipient to use the identified private key, and authenticating the identity of the specified recipient. More specifically, processing continues by conducting operations 44, 46, 48, 50, 52, 54, 56, 58, and 64 as described herein with regard to the exemplary process illustrated in FIG. 3, for the specified recipient. The authentication data requirement 34 for an encrypted e-mail message may be the same or different than for an e-mail message.

After successfully authenticating 58 the specified recipient, the AC system 16 continues by generating and transmitting a successful authentication message to the PK system 14. In response, the PK system 14 continues processing by applying the identified private key 90 to the encrypted session key to thus decrypt the encrypted session key 90, and transmitting the decrypted session key to the client device 12-2. In response to receiving the decrypted session key, the client device 12-2 continues processing by decrypting the received e-mail message 92 with the decrypted session key and displaying the e-mail message contents 92 for the recipient to see and read. Next, processing ends 52.

In each of the exemplary processes described herein, the permission granted by the user is for a single transaction. However, in alternative processes, the permission granted by the user may be for a plurality of transactions or may be effective for all transactions relating to the user that occur during a fixed period of time. For example, the permission granted may be effective for two hours. Thus, after receiving permission to use the identified private key of the user, the PK system 14 is automatically permitted to use the identified private key for all transactions of the same type relating to the user for two hours after receiving permission.

Because the users of the client devices 12-m use a MC device 18 to capture authentication data in accordance with the authentication data capture request, authentication of the user is out-of-band for each of the exemplary processes described herein. However, a user may not have access to both a client device 12-m and his MC device 18 when desiring to conduct any of the exemplary processes described herein. Consequently, in other alternative exemplary embodiments, the processes described herein may be conducted with either the MC device 18 or a client device 12-m of the user. Because either a MC device 18 or a client device 12-m is used in such alternative embodiments, one device is used. As a result, it should be understood that communications of such alternative embodiments are not conducted out-of-band. Instead, communications of such alternative embodiments are conducted in-band over the communications channel of the one device. It should be understood that such alternative embodiments enable conducting any of the exemplary processes described herein, as an in-band process, with either the client device 12-m or the MC device 18 of the user.

The processes and systems described herein store private keys in secure systems that are remote and different from personal devices trusted by a user, and authenticate users before applying a private key of the user to data. As a result, the processes and systems described herein avoid the threat posed by malware resident on personal devices trusted by users, and are believed to be applicable to many different businesses for reducing risks that private keys will be surreptitiously obtained by imposters and fraudulently used to render ineffective the protection provided by cryptographic public-private key pair security techniques.

In each embodiment, the above-described processes for increasing the security of private keys facilitate enhancing the security of systems, data, and information that depend on the integrity of cryptographic public-private key pair security techniques. More specifically, after generating data for transmission the data is processed. Processing the generated data includes at least preparing other data. The other data includes, but is not limited to, a hash calculated of the generated data or an encrypted session key. After receiving permission from a user to use one of his private keys, the user is authenticated. After successfully authenticating the user, a secure computer system applies the private key of the user to the prepared other data, and the transaction data is transmitted to other devices for recipients to see. The private keys are stored on the secure computer system instead of on a personal device trusted by the user. As a result, the security of systems, data and information that depend on the integrity of cryptographic public-private key pair security techniques is facilitated to be enhanced, and the costs, time, inconvenience and frustrations associated with fraudulent use of private keys by imposters are facilitated to be reduced. Accordingly, the security of systems, data, and information that depend on the integrity of cryptographic public-private key pair security techniques is facilitated to be enhanced in a cost effective and reliable manner.

Exemplary embodiments of processes for increasing the security of private keys against imposter attacks are described above in detail. The processes are not limited to use with the specific computer systems described herein, but rather, the processes can be utilized independently and separately from other computer components described herein. For example, the processes for increasing the security of private keys as described herein may be implemented in most computer systems and may be used for a wide range of transaction scenarios, including accessing confidential patient medical records over a network. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for increasing the security of private keys comprising:
   requesting, by a processor, that permission be obtained from a user to use a private key, the private key being associated with the user and being included in a public-private key pair;
   generating a biometric template from biometric data captured from the user and authenticating the user based on the generated template after user permission is obtained, the biometric data being determined based on a level of biometric authentication corresponding to the private key, the private key being used for types of transactions matching a transaction desired to be conducted by the user; and
   after successfully authenticating the user, applying, by the processor, the private key to data derived from transaction data, the transaction data being for the desired transaction.

2. A method in accordance with claim 1 further comprising conducting the desired transaction with the transaction data.

3. A method in accordance with claim 1 further comprising:
   associating a certification of the user with the transaction data;
   determining where the private key is located;
   generating an identifier for the transaction data; and
   preparing the derived data.

4. A method in accordance with claim 1 further comprising:
   transmitting the derived data to a computer; and
   conducting the desired transaction using the computer.

5. A method in accordance with claim 1 further comprising:
   generating an authentication data requirement; and
   prompting, using a computer, the user to capture authentication data in accordance with the authentication data requirement when the user is unsuccessfully authenticated.

6. A method in accordance with claim 1, the transaction data being an e-mail message, the method further comprising:
   generating a signed e-mail message and transmitting the signed e-mail message to a device operated by a recipient;
   determining whether a certificate included in the received e-mail message is valid; and
   determining the trustworthiness of the received e-mail message after the certificate is determined to be valid.

7. A method in accordance with claim 6, said determining the trustworthiness operation comprising:
   determining a hash of the signed e-mail message calculated prior to transmission;
   calculating a hash of the received e-mail message;
   comparing the hash of the signed e-mail message against the calculated hash; and
   determining the e-mail message is trustworthy when the hashes match.

8. A method in accordance with claim 1 further comprising identifying a component of a private key security computer system that stores private keys for a user that are each used for different types of transactions.

9. A computer system for increasing the security of private keys comprising:
   a private key computer programmed to store private keys; and
   an authentication system programmed to authenticate users and to communicate with said private key computer over a network, wherein:
   said private key computer is further programmed to request that permission be obtained from a user to use a private key for the user;
   said authentication system is further programmed to generate a biometric template from biometric data captured from the user and authenticate the user based on the generated template after user permission is obtained, the biometric data being determined based on a level of biometric authentication corresponding to the private key, the private key being used for types of transactions matching a transaction desired to be conducted by the user; and after the user is successfully authenticated, said private key computer is further programmed to apply the private key to data derived from transaction data, the transaction data being for the desired transaction.

10. A computer system in accordance with claim 9 further comprising a client computer programmed to conduct the desired transaction with the transaction data and to communicate with said private key computer and said authentication system over the network.

11. A computer system in accordance with claim 9 further comprising a client computer programmed to:
associate a certification of the user with the transaction data;
determine where the private key is located;
generate an identifier for the transaction data;
prepare the derived data; and
communicate over the network.

12. A computer system in accordance with claim 9 further comprising a client computer programmed to:
receive, over the network, the derived data from said private key computer; and
conduct the desired transaction.

13. A computer system in accordance with claim 9, said authentication system being further programmed to:
generate an authentication data requirement; and
transmit a message over the network to a client computer for prompting the user to capture authentication data in accordance with the authentication data requirement after the user is unsuccessfully authenticated.

14. A computer system in accordance with claim 9 further comprising a client computer programmed to generate a signed e-mail message and transmit the signed e-mail message over the network to a second client computer, the e-mail message being the transaction data, the second client computer being programmed to determine whether a certificate included in the received e-mail message is valid and determine the trustworthiness of the received e-mail message after the certificate is determined to be valid.

15. A computer system in accordance with claim 14, said second client computer being programmed to:

determine a hash of the signed e-mail message calculated prior to transmission over the network;
calculate a hash of the received e-mail message;
compare the hash of the signed e-mail message against the calculated hash; and
determine the e-mail message is trustworthy when the hashes match.

16. A computer system in accordance with claim 9 wherein said private key computer categorizes the private keys for each user according to a type of transaction.

17. A non-transitory computer-readable recording medium included in a private key security computer system for enabling increased security of private keys, the computer readable medium being comprised of instructions, which when read and executed by the private key security computer system, cause the private key security computer system to:
determine whether permission has been obtained from the user to use a private key for the user, the private key being the private key included in a public-private key pair of the user;
generate a biometric template from biometric data captured from the user and authenticate the user based on the generated template after user permission is obtained, the biometric data being determined based on a level of biometric authentication corresponding to the private key, the private key being used for types of transactions matching a transaction desired to be conducted by the user; and
after the user is successfully authenticated, apply the private key to data derived from the transaction data, the transaction data being for the desired transaction.

18. A non-transitory computer-readable recording medium in accordance with claim 17, wherein the instructions when read and executed by the private key security computer system, cause the private key security computer system to categorize the private keys for each user according to a transaction type.

\* \* \* \* \*